United States Patent [19]
Möller

[11] Patent Number: 5,327,996
[45] Date of Patent: Jul. 12, 1994

[54] CENTRAL SWIVEL JOINT FOR OPTIMIZING GROUND ADAPTATION OF FRONT MACHINERY OF FARM TRACTORS

[75] Inventor: Heribert Möller, Sachsen, Fed. Rep. of Germany

[73] Assignee: MAN Nutzfahrzeuge AG, Munich, Fed. Rep. of Germany

[21] Appl. No.: 37,368

[22] Filed: Mar. 26, 1993

[30] Foreign Application Priority Data

Apr. 3, 1992 [DE] Fed. Rep. of Germany ....... 4211110

[51] Int. Cl.⁵ ............................................. F16C 17/00
[52] U.S. Cl. ........................................ 184/5; 184/7.2; 184/6; 180/383; 280/400
[58] Field of Search ........................ 184/6.19, 5, 7.2, 6; 180/383, 384, 385; 280/400; 123/196 R

[56] References Cited

U.S. PATENT DOCUMENTS 1,648,393 11/1927 Gahm ................................... 184/7.2
1,878,379 9/1932 Church ..................................... 184/6
2,276,145 3/1942 Bijur ..................................... 184/7.2

FOREIGN PATENT DOCUMENTS 3713928 11/1988 Fed. Rep. of Germany ...... 280/400

Primary Examiner—Thomas E. Denion
Attorney, Agent, or Firm—Robert W. Becker Associates

[57] ABSTRACT

A central swivel joint for optimizing ground adaptation of front machinery of farm tractors has a central beam and a support beam that are rigidly connected to one another to form a constructive unitary part. A support is provided which has a friction bearing in which the support beam is supported. The friction bearing includes a floating bearing and a stationary bearing and is connected to the lubrication system of the motor of the farm tractor for lubrication purposes. The central beam can be in the form of a conventional square beam. Furthermore, the stationary bearing for receiving the axial forces that are exerted onto the central beam is freely accessible as long as the support has not been connected to the oil pan.

2 Claims, 3 Drawing Sheets

CENTRAL SWIVEL JOINT FOR OPTIMIZING GROUND ADAPTATION OF FRONT MACHINERY OF FARM TRACTORS

BACKGROUND OF THE INVENTION

The present invention relates to a central swivel joint comprised of a support beam and a central beam, whereby the support beam is rigidly connected to the centrally arranged oil pan of the motor of the farm tractor and the central beam is rotatably supported about its longitudinal axis relative to the support beam at a friction bearing comprised of a floating bearing and a stationary bearing.

For rotating a central beam about its longitudinal axis it is known to support the central beam with a radially guided floating bearing and a radially and axially guided stationary bearing relative to the support beam. The support means is rigidly connected to the oil pan of the motor arranged at the center of the tractor. The oil pan is thus a supporting component which connects the front axle and the rear axle on the one hand via the central beam and on the other hand via gear box casing, a coupling casing, and a flywheel casing. The bearing of the support beam in the interior of the central beam is embodied as a welded construction. The axial guiding of the stationary bearing is achieved by a bolt which is inserted transverse to the axis of rotation into an annular groove on the support beam. The known embodiment requires a plurality of components. It cannot be connected with the lubricating system of the motor because a return passage for the oil is very difficult to establish and the central beam must be prepared by complicated procedures in the form of a welded construction for receiving the bearing of the support beam. The insufficient lubrication results in a fast wear. Furthermore, the axial guiding of the stationary bearing is a weak point in view of the high axial forces.

It is therefore an object of the present invention to provide a central swivel joint of the aforementioned kind that can be manufactured in a more economic manner and which has an improved lubrication in order to increase the service life of such a central swivel joint.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The central swivel joint for optimizing ground adaptation of front machinery of farm tractors according to the present invention is primarily characterized by:

A central beam and a support beam rigidly connected to one another to form a constructive unitary part;

A support comprising a friction bearing, the support beam supported in the friction bearing; and The friction bearing comprised of a floating bearing and a stationary bearing and, for lubrication purposes, connected to a lubrication system of a motor of the farm tractor.

Preferably, the floating bearing is radially guided and the stationary bearing is radially and axially guided: The stationary bearing is connected to a free end of the support beam remote from the central beam. The support beam preferably has bores and connecting lines to the lubrication system for supplying the floating bearing and the stationary bearing with lubricant from the lubrication system. The support has a return line for returning lubricant from the floating and the stationary bearings to the oil pan of the lubrication system of the motor.

Advantageously, the central beam has two rotary abutments at an end facing the support beam. The rotary abutments have radial symmetry relative to an axis of rotation of the support beam. The support has fixed abutments arranged with radial symmetry relative to the axis of rotation of the support beam, the fixed abutments coordinated with the rotary abutments of the central beam.

By reversing the supporting principle, i.e., providing a rigid connection of central beam and support beam and by providing a rotatable supporting action of the support beam within the support, the central beam can be provided in a very simple manner, for example, as a conventional square beam. The bearing system does not require an expensive and complicated welded bearing support. The stationary bearing, which is provided at the free end, i.e., at the end of the support beam which is accessible, can therefore be dimensioned liberally. The service life of the swivel joint is considerably increased by incorporating it into the lubrication system of the motor.

DESCRIPTION OF PREFERRED EMBODIMENTS

The present invention will now be described in detail with the aid of several specific embodiments utilizing FIGS. 1 through 3.

Figure 1:
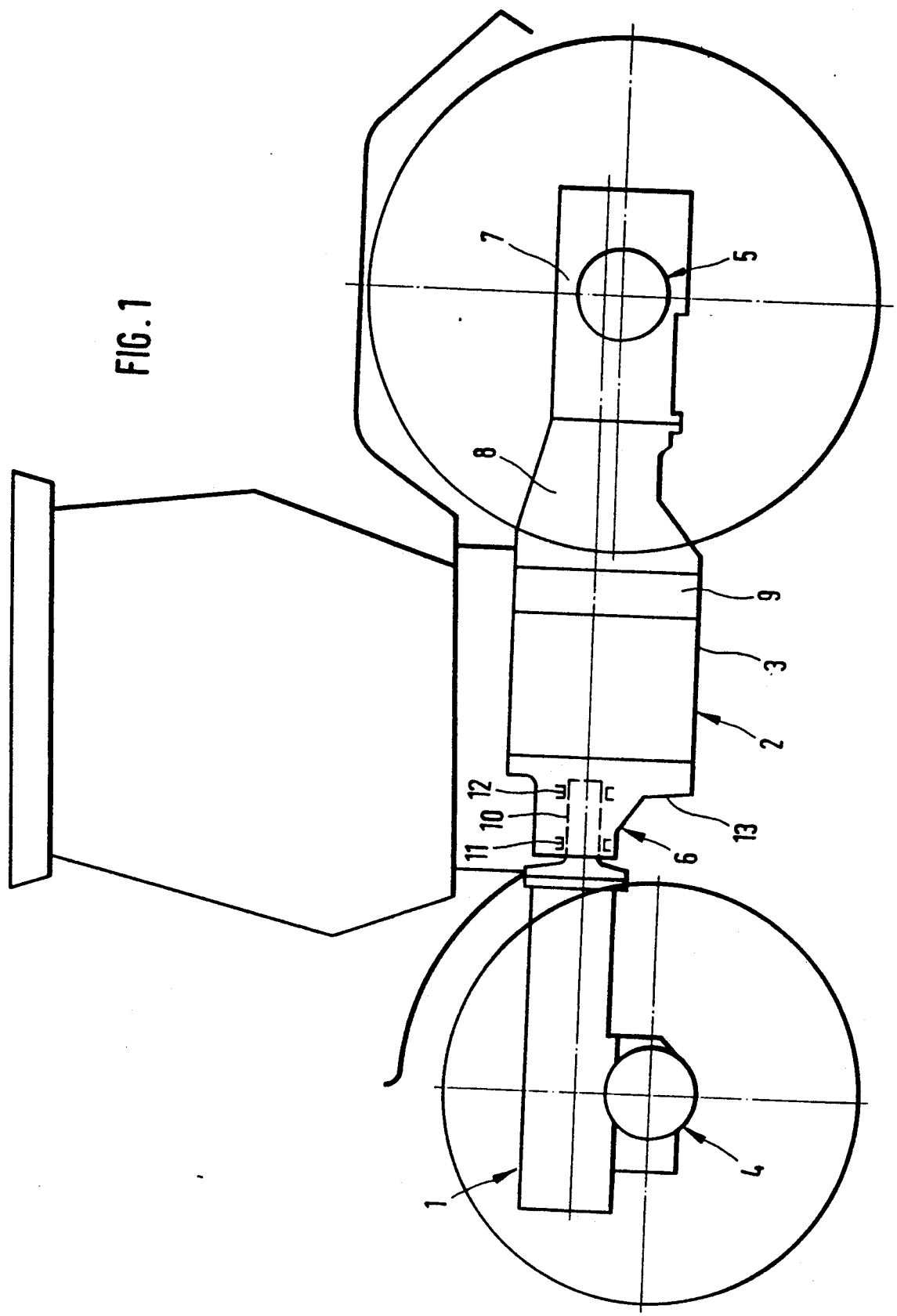
FIG. 1 is a side view of a farm tractor with a central swivel joint.

FIG. 1 shows a farm tractor to which farming machinery may be connected at the front end via the central beam 1. At the center of the tractor the motor 2, with its oil pan 3 as a supporting component, are provided. The oil pan 3 is an integral (unitary) part which connects the front axle 4 to the rear axle 5. The connection of the front axle 4 via the oil pan 3 is achieved by the central beam 1 and the central swivel joint 6 while the connection of the rear axle 5 to the oil pan 3 is achieved with a Gear box casing 7, a coupling casing 8, and a fly wheel casing 9.

Since the front axle 4 which is rigidly connected to the central beam 1 and the farming machinery which is connected to the central beam 1 must adapt to the contour of the ground a central swivel joint 6 is provided. The swivel joint 6 is comprised of a support beam 10 which is rotatably supported by a floating bearing 11 and a stationary bearing 12. The bearings 11 and 12 are arranged within a support 13 which is fixedly connected to the oil pan 3 by screws. The central beam 1 is also connected by screws to the support beam 10.

Figure 2:
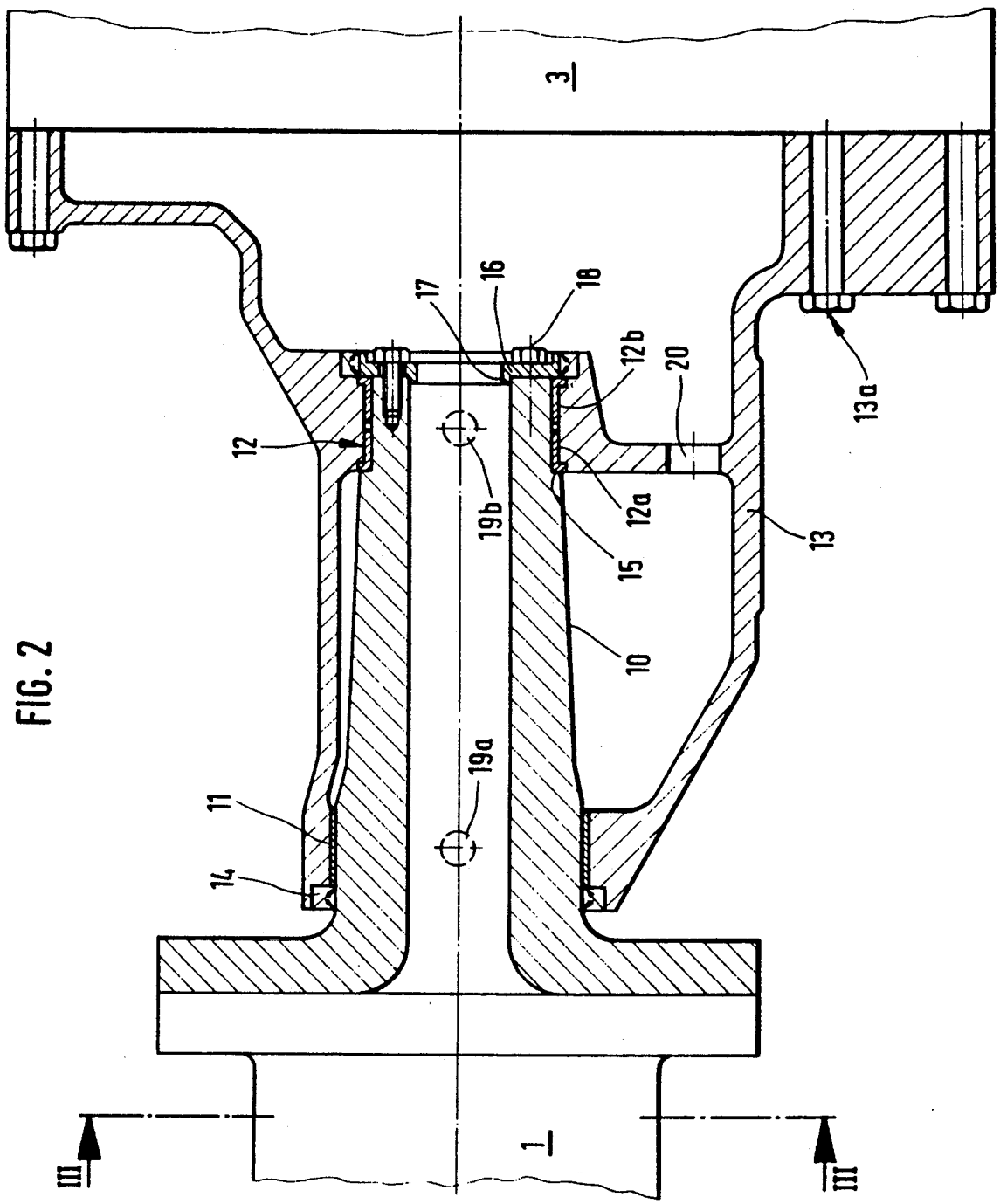
FIG. 2 is a detail of a swivel joint in a longitudinal section.

FIG. 2 shows in a longitudinal section a detailed representation of the supporting structure of the support beam 10 within the support 13. Inventively, the central beam 1 is connected with screws in a rigid manner to the support beam 10 and the support 10, in turn, is rotatably supported at the support 13 via the floating bearing 11 and the stationary bearing 12. The support 13 is flanged with screws 13a to the oil pan 3. The floating bearing 11 is purely a radial bearing, which is protected by a retaining ring 14 against introduction of dirt and leakage of lubricant.

The stationary bearing 12 is provided with a combined radial and axial guiding system. The axial guiding is achieved by a flange 15 at the support beam 10 and on the other hand by an annular abutment 16. The annular abutment 16 is centered by the radial guide 17 at the support beam 10 and secured by screws 18 to the support beam 10, so that it is secured against axial movement.

The stationary bearing 12 is provided with separate bearing boxes 12a and 12b which can be inserted into a bore of the support 13 provided for receiving the bearing boxes 12a, 12b from either end of the support 13. For lubricating the bearings 11 and 12 two bores 19a, 19b are provided which are connected with non-represented lines to the lubrication system of the motor (FIG. 1). Via an opening 20 within the support 13 the lubricant or lubricating oil can be returned into the oil pan 3.

With the inventive support of the central beam 1 the bearings 11 and 12 can be connected to the lubrication system of the motor 2 (FIG. 1) so that the wear of the bearings 11 and 12 is minimized. The total number of required components is reduced, and the high axial forces can be compensated by the well constructed stationary bearing 12 without causing any damage.

Figure 3:
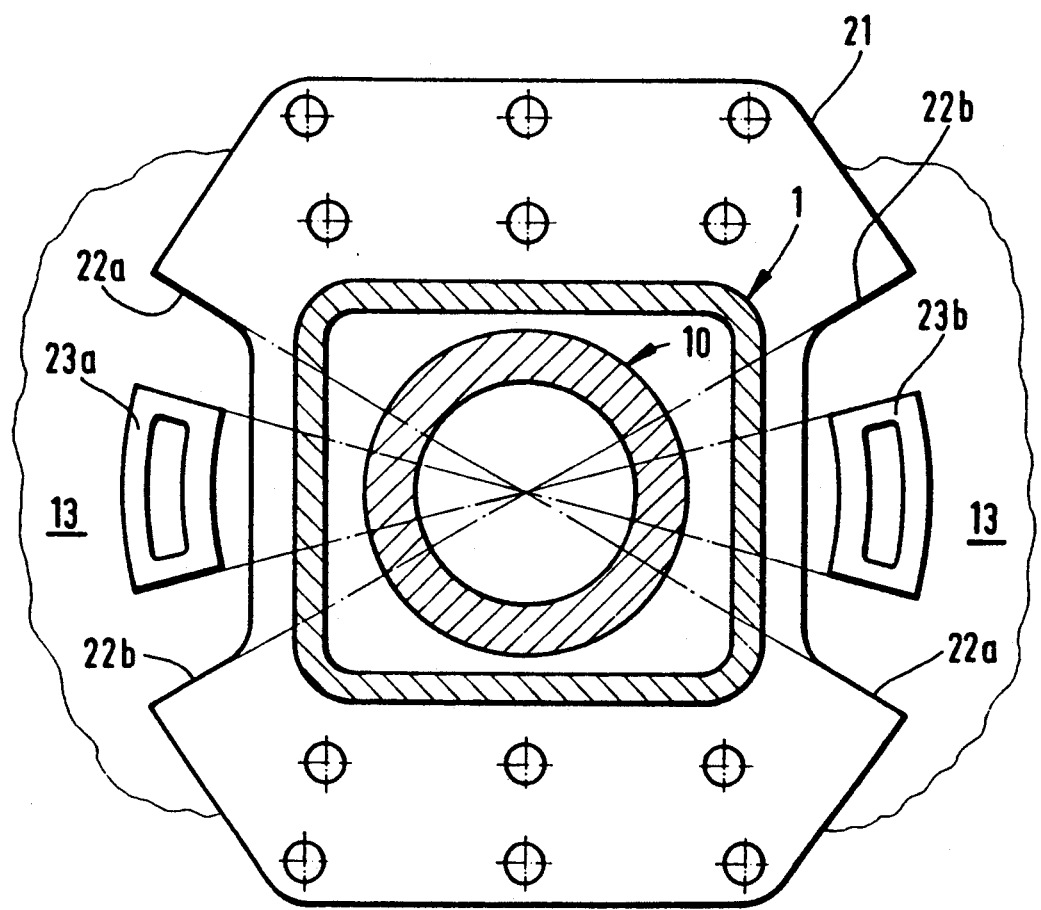
FIG. 3 is a cross-section along the line III-III showing the rotary abutments of the central beam.

FIG. 3 shows a section along the line III—III of FIG. 2. A flange 21 of the central beam 1 is provided with two rotary abutments 22a and 22b which have radial symmetry to the rotational center of the support beam 10. Between the rotary abutments 22a, 22b stationary or fixed abutments 23a, 23b are provided which are components of the support 13 (FIG. 1 and 2, not represented in detail in FIG. 3). Due to the radial symmetry no transverse forces will be exerted onto the support beam 10 upon abutting of the rotary abutments 22a, 22b against the stationary or fixed abutments 23a, 23b because the torque of the central beam 1 results in a force pair due to the rotational limitation that causes a counter torque so that the forces of equal size but opposite signs are compensated. One of the stationary or fixed abutments 23a or 23b can be embodied as an adjustable abutment so that upon abutting of one of the rotary abutments 22a or 22b no play is observed relative to the other stationary or fixed abutment.

The present invention is, of course, in no way restricted to the specific disclosure of the specification and drawings, but also encompasses any modifications within the scope of the appended claims.

What I claim is:

1. A central swivel joint for optimizing ground adaptation of front machinery of farm tractors, said central swivel joint comprised of:
    a central beam and a support beam rigidly connected to one another to form a constructive unitary part;
    a support comprising a friction bearing, said support beam supported in said friction bearing;
    said friction bearing comprised of a floating bearing and a stationary bearing and, for lubrication purposes, connected to a lubrication system of a motor of the farm tractor for lubrication;
    said central beam having two rotary abutments at an end facing said support beam, said rotary abutments having radial symmetry relative to an axis of rotation of said support beam; and
    said support having fixed abutments arranged with radial symmetry relative to said axis of rotation of said support beam and coordinated with said rotary abutments.

2. A central swivel joint according to claim 1, wherein:
    said floating bearing is radially guided and said stationary bearing is radially and axially guided;
    said stationary bearing is connected to a free end of said support beam remote from said central beam;
    said support beam having bores and connecting lines to the lubrication system for supplying said floating bearing and said stationary bearing with lubricant from the lubrication system; and
    said support having a return line for returning lubricant from the said floating and said stationary bearings, to an oil pan of the lubrication system.

* * * * *